United States Patent [19]

Brown et al.

[11] Patent Number: 5,066,332

[45] Date of Patent: Nov. 19, 1991

[54] LOW CORROSION HOT MELT INK

[75] Inventors: Edward A. Brown, Kent; John P. N. Haxell, Bath; Derek E. Wilson, Somerset, all of Great Britain

[73] Assignee: Coates Electrographics Limited, Bath, England

[21] Appl. No.: 528,103

[22] Filed: May 23, 1990

[51] Int. Cl.$^5$ ............................................. C09D 11/12
[52] U.S. Cl. ................................ 106/31; 106/14.38; 106/14.35; 106/30
[58] Field of Search ............... 106/30, 31, 272, 14.38, 106/14.35

[56] References Cited

U.S. PATENT DOCUMENTS

| | | | |
|---|---|---|---|
| 4,280,939 | 7/1981 | Johnson | 106/31 |
| 4,390,369 | 7/1983 | Merritt et al. | 106/31 |
| 4,479,981 | 10/1984 | Winters et al. | 106/14.34 |
| 4,484,948 | 11/1984 | Merritt et al. | 106/27 |
| 4,738,889 | 4/1988 | Suzuki et al. | 106/23 |
| 4,851,045 | 7/1989 | Taniguchi | 106/272 |

*Primary Examiner*—Theodore Morris
*Assistant Examiner*—Mary C. DiNunzio
*Attorney, Agent, or Firm*—Brumbaugh, Graves, Donohue & Raymond

[57] ABSTRACT

In the particular embodiments described in the specification, low-corrosion hot melt ink contains 0.5% to 10% by weight of a metallo-organic compound such as overbased calcium sulphonate, basic barium sulphonate and overbased sulphurized calcium alkyl phenate as a corrosion inhibitor. Such inks produce no significant corrosion of printing system components after extended exposure at elevated temperatures.

10 Claims, No Drawings

5,066,332

LOW CORROSION HOT MELT INK

BACKGROUND OF THE INVENTION

This invention relates to hot melt ink and, more particularly, to a new and improved hot melt ink which is effective to inhibit corrosion of the components of the system in which the ink is used.

Conventional printing systems for applying hot melt ink such as ink jet printers contain many components which are subject to corrosion resulting from contact with the ink. For example, piezoelectric transducers containing lead zirconium titanate, tin-lead alloy solder, nickel, aluminum, epoxy polymers, copper beryllium alloys and stainless steel are sensitive to either metallic or ionic impurities in the ink which can lead to rapid corrosion or electrochemical attack. Since typical chemical reaction rates increase by a factor of about 2 for every 10° C. temperature rise, corrosion problems in hot melt ink jet systems which may operate at temperatures as high as 160° C. are much more severe than those encountered in printing systems which operate at room temperature. On the other hand, many hot melt ink components, including stearic acid, paraffin wax, polyethylene wax, carnauba wax, candelilla wax, montan wax, hydrogenated castor oil, microcrystalline wax, behenic acid, aluminum stearate, synthetic ester waxes, oxidized polyethylene waxes, lauric acid, Fischer-Tropsch waxes, esparto waxes, dammar wax, oxazoline wax, bisamide waxes, amide waxes, oleamides, stearamides, lauramides, erucamide, glycerol monostearate, glycerol tristearate, chlorinated waxes, cetyl alcohol, stearone, laurone, diphenyl phthalate, dicyclohexyl phthalate, camphor, triphenyl phosphate, n-ethyl toluene sulphonamide, n-cyclohexyl-p toluene sulphonamide and others, as well as certain polymeric materials, such as cumarone-indene polymer, rosin, rosin ester, hydrogenated resins, cyclic ketone polymers, styrene allyl alcohol polymers, polystyrenes, polyvinyl toluene/methylstyrene polymer, alkyl hydrocarbon polymer, aryl hydrocarbon polymers, alkyl aryl hydrocarbon polymer, terpene polymers, styrene-acrylates, ethylene-vinyl acetates, polypropylene, gilsonite and other asphaltic materials, cyclic hydrocarbon polymer, halogenated polymers and polyester polymers can all cause measurable rates of corrosion of sensitive materials, such as components made of copper-beryllium, stainless steel and the like, at temperatures in the range from 120° C. to 160° C. Further, as described in *Chemical Technology and Analysis of Fats & Waxes* by Lewkowitsch and Warburton (Vol. 1, page 143), many molten higher fatty acids will react slowly with metals, such as copper, lead and the like, with the evolution of hydrogen, and it has been found that many waxes or waxlike materials corrode metals at elevated test temperatures even when the waxes are stated to be acid-free. In addition, there is the possibility that acidic degradation products may be generated during the hot storage of such molten waxes and polymers which could affect the physical properties of the ink.

Another component of a hot melt ink is the colorant which may be either a dye or a pigment. Exemplary colorants include the following list: solvent yellow 162, 79, 81, solvent orange 56, solvent brown 58, solvent red 122, 119, 100, solvent blue 70, solvent red 35, solvent black 27, 45, 47, solvent red 49, basic red 51, solvent violet 8, solvent blue 4, disperse yellow 64, solvent red 135, solvent red 195, disperse violet 26, solvent yellow 16, 56, 6, 7, 14, solvent red 1, 23, 24, 27, 49, solvent blue 35, solvent black 3, disperse orange 201, solvent yellow 93, disperse yellow 54, disperse red 60, solvent red 52, disperse violet 31, and the like.

Amongst pigments that may be successfully used are the following: pigment yellows 1, 3, 12, 13, 14, 16, 17, 73, 74, 81, 83, 97, 98, 106, 113, 114; pigment reds 2, 3, 4, 5, 6, 7, 8, 9, 12, 14, 37, 38, 48:1, 48:2, 48:3, 48:4, 57:1, 57:2, 57:3, 88, 122, 146, 147; pigment blues 15:1, 15:2, 15:3, 15:4, 56, 61, 61:1; and pigment blacks 1, 20, carbon black, acetylene black, bone black, lamp black, graphite, and the like.

These materials may contain trace amounts of acidic or corrosive compounds or, under conditions of prolonged hot storage, they may produce, or react or degrade to produce, corrosive compounds.

Although known anticorrosion agents have been added to materials such as ink to prevent or inhibit corrosion of components with which the ink comes in contact, many of those agents have been found to have little or no effect in inhibiting corrosion of printing system components by hot melt inks used at high temperatures. In addition, the use of those agents may modify the physical or optical properties of such inks in an undesirable way. For example, many anticorrosion or antioxidation agents containing, for example, butyrated hydroxytoluene, substituted benzimadazole, calcium oxide, calcium stearate, lead naphthenate, neutralized calcium sulphonate, neutral barium sulphonate, lead sulphonate, zinc sulphonate and organic bases, when added in the range of 1% to 3% to hot melt inks, were found to be substantially ineffective to inhibit corrosion or caused undesirable changes in the physical or optical properties of the ink.

SUMMARY OF THE INVENTION

Accordingly, it is an object of the present invention to provide a hot melt ink which overcomes the above-mentioned disadvantages of the prior art.

Another object of the invention is to provide a new and improved hot melt ink which reduces or eliminates corrosion of components of the hot melt ink system without detrimental effect on the physical and optical properties of the ink.

These and other objects of the invention are attained by providing a hot melt ink that contains as a corrosion inhibitor from 0.5% to 5% of an essentially basic, heat-stable, metallo-organic sulphonate compound. Preferably, the sulphonate compound is selected from the group consisting of ammonium dinonyl naphthalene sulphonate, basic barium dinonyl naphthalene sulphonate, neutral barium dinonyl naphthalene sulphonate, ethylene diamine dinonyl naphthalene sulphonate, basic barium sulphonate naphthalene sulphonate, overbased sulphurized calcium alkyl phenate, basic calcium sulphonate, overbased calcium sulphonate and highly overbased calcium sulphonate. These materials are oil-soluble, heat-stable, acid-accepting acid neutralizers, and they tend to be effective metallic corrosion inhibitors at elevated temperatures.

Without limiting the scope of this invention, it is believed that the chemical neutrality of the ink can be maintained by inhibiting the amount of oxygen in the ink, thus reducing the amount of acids formed. Further, the termination or interruption of peroxide formation or by selective oxidation of the additive rather than the ink or by the formation of an inert chemical film on the surface of the ink jet head can all lead to improved ink jet head performance.

Further desirable properties of anticorrosion additives according to the invention are: low volatility, stability with respect to time and temperature, long activity, low toxicity, high effectiveness at low concentrations, and minimum color or absence of color to avoid lowering the color purity of the ink.

One corrosion inhibitor which was found to be particularly effective for use in hot melt ink is the overbased calcium sulphonate marketed by Texaco as TLA414, which has a calcium content of about 15.2% and a total base number of 400.

DESCRIPTION OF PREFERRED EMBODIMENTS

A hot melt ink according to the invention containing from 0.5% to 5%, and preferably from 1% to 3%, of a highly overbased calcium sulphonate such as, for example, the calcium sulphonate product marketed by Texaco under the tradename TLA 414A having a calcium content of 15.2% and a total base number of 400, was found to be especially effective in inhibiting corrosion. With this additive, hot melt inks containing microcrystalline wax, paraffin wax, modified microcrystalline wax and hydrocarbon polymers were found to cause substantially no corrosion of tin-lead soldered plates and other metal components when they were immersed in the inks at 150° C.

EXAMPLES 1-3

Hot melt inks containing solvent yellow and the proportions of microcrystalline wax, paraffin wax, modified microcrystalline wax and hydrocarbon polymer set forth in Table I were prepared without any additive and with approximately 1% and 3% by weight of the Texaco TLA 414A overbased calcium sulphonate and were maintained at 150° C. for 280 hours. The tin-lead soldered parts were inspected after 120 hours and 280 hours, and the results are given in Table I.

TABLE I

|  | Example 1 | Example 2 | Example 3 |
|---|---|---|---|
| Microcrystalline wax | 20.0 | 20.0 | 20.0 |
| Paraffin wax | 50.4 | 50.4 | 50.4 |
| Modified microcrystalline wax | 4.0 | 4.0 | 4.0 |
| Hydrocarbon polymer | 110.0 | 110.0 | 110.0 |
| Overbased calcium sulphonate | 0 | 2.0 | 6.0 |
| Corrosion after 120 hours at 150° C. | Very visible | Nil | Nil |
| Corrosion after 280 hours at 150° C. | Severe | Very slight | Nil |

Similar ink formulations were also prepared containing 2.5%, 5% and 7.5% by weight of TLA 414A overbased calcium sulphonate and, although a tendency to form froth on stirring was noted with increasing concentration, each of the inks was essentially noncorrosive of printing system components after extended exposure to the ink at high temperature.

EXAMPLES 4-6

Hot melt inks containing pigment blue and the proportions of stearone, microcrystalline wax, modified microcrystalline wax, hydrogenated hydrocarbon polymer and methyl styrene polymer set forth in Table II were prepared without any additive and with approximately 1% and 3% by weight of the Texaco TLA107 basic barium sulphonate and were maintained at 150° C. for 280 hours. The parts were inspected after 120 hours and 280 hours, and the results are given in Table II.

TABLE II

|  | Example 4 | Example 5 | Example 6 |
|---|---|---|---|
| Stearone | 24.0 | 24.0 | 24.0 |
| Polybutene | 7.3 | 7.3 | 7.3 |
| Microcrystalline wax | 13.7 | 13.7 | 13.7 |
| Modified microcrystalline wax | 4.7 | 4.7 | 4.7 |
| Hydrogenated hydrocarbon polymer | 25.0 | 24.0 | 22.0 |
| Methyl styrene polymer | 25.3 | 25.3 | 25.3 |
| Basic barium sulphonate | 0 | 1.0 | 3.0 |
| Corrosion after 120 hours at 150° C. | Visible | Slight | Nil |
| Corrosion after 280 hours at 150° C. | Severe | Some | Slight |

EXAMPLES 8 AND 9

Hot melt inks containing disperse red 60 dye and the proportions of polyethylene polymer, linear alcohol and hydrogenated hydrocarbon polymer set forth in Table III were prepared without any additive and with approximately 1.5% by weight of Texaco TLA320 overbased sulphurized calcium alkyl phenate and were maintained at 150° C. for 120 hours, and the results are given in Table III.

TABLE III

|  | Example 8 | Example 9 |
|---|---|---|
| Polyethylene polymer (MW 500) | 34.5 | 33.0 |
| Linear alcohol (MW 700) | 5.0 | 5.0 |
| Hydrogenated hydrocarbon polymer | 58.5 | 58.5 |
| Disperse red 60 dye | 2.0 | 2.0 |
| Overbased sulphurized calcium alkyl phenate | 0 | 1.5 |
| Corrosion after 120 hours at 150° C. | Severe | Slight |

Although the invention has been described herein with reference to specific embodiments, many modifications and variations therein will readily occur to those skilled in the art. Accordingly, all such variations and modifications are included within the intended scope of the invention.

We claim:

1. A hot melt ink comprising a coloring agent, a thermoplastic vehicle containing the coloring agent, and 0.5 to 10 weight percent of a corrosion inhibitor selected from the group consisting of a basic heat stable metalloorganic sulphonate and overbased sulphurized metallophenate.

2. A hot melt ink according to claim 1 wherein the corrosion inhibitor is present in an amount of about 1 to about 5 weight percent.

3. A hot melt ink according to claim 1 wherein the basic metallo-organic compound has a calcium content in the range from about 10 to about 20 percent.

4. A hot melt ink according to claim 1 wherein the basic metallo-organic compound has a total base number in the range from about 200 to about 600.

5. A hot melt ink according to claim 1 wherein the thermoplastic vehicle comprises a hydrocarbon polymer.

6. A hot melt ink according to claim 1 wherein the thermoplastic vehicle comprises a wax.

7. A hot melt ink according to claim 1 wherein the thermoplastic vehicle comprises a blend of blends of waxes, waxlike materials and organic polymers.

8. A hot melt ink according to claim 1 wherein the basic metallo-organic compound comprises an overbased calcium sulphonate.

9. A hot melt ink according to claim 1 wherein the basic metallo-organic compound comprises a basic barium sulphonate.

10. A hot melt ink according to claim 1 wherein the basic metallo-organic compound comprises an overbased sulphurized calcium alkyl phenate.

* * * * *